US009577535B2

(12) United States Patent
Kimura et al.

(10) Patent No.: US 9,577,535 B2
(45) Date of Patent: Feb. 21, 2017

(54) POWER CONVERSION APPARATUS

(71) Applicants: DENSO CORPORATION, Kariya, Aichi-pref. (JP); NIPPON SOKEN, INC., Nishio, Aichi-pref. (JP)

(72) Inventors: Norihito Kimura, Hekinan (JP); Kimikazu Nakamura, Handa (JP); Yuji Hayashi, Kasugai (JP)

(73) Assignees: DENSO CORPORATION, Kariya (JP); NIPPON SOKEN, INC., Nishio (JP)

( * ) Notice: Subject to any disclaimer, the term of this patent is extended or adjusted under 35 U.S.C. 154(b) by 0 days.

(21) Appl. No.: 14/176,454

(22) Filed: Feb. 10, 2014

(65) Prior Publication Data

US 2014/0226368 A1 Aug. 14, 2014

(30) Foreign Application Priority Data

Feb. 12, 2013 (JP) .................................. 2013-024769

(51) Int. Cl.
 *H02M 3/24* (2006.01)
 *H02M 3/335* (2006.01)
 *H02M 1/00* (2006.01)

(52) U.S. Cl.
 CPC . *H02M 3/33507* (2013.01); *H02M 2001/0041* (2013.01)

(58) Field of Classification Search
 CPC ...... H02M 3/33507; H02M 1/32; H02M 1/36; H02M 2001/0041; H02M 2001/0035; H02M 3/33587; H02M 3/156; H02M 3/157; H02M 3/1588; H02M 3/335–3/3376; H02M 1/44; H02M 7/53871

USPC .............................. 363/98; 323/284, 351, 98
See application file for complete search history.

(56) References Cited

U.S. PATENT DOCUMENTS

| 6,154,375 | A | * | 11/2000 | Majid | ..................... H02M 1/36 323/901 |
| 7,965,524 | B2 | * | 6/2011 | Balakrishnan et al. | ... 363/21.13 |
| 2002/0135345 | A1 | | 9/2002 | Terashi | |
| 2004/0037098 | A1 | * | 2/2004 | Konno | .............. H02M 3/33523 363/49 |
| 2008/0084723 | A1 | | 4/2008 | Balakrishnan et al. | |
| 2008/0157742 | A1 | * | 7/2008 | Martin | ................ H02M 3/1584 323/284 |

(Continued)

FOREIGN PATENT DOCUMENTS

| JP | 2000-270546 | 9/2000 |
| JP | 2002-281742 | 9/2002 |

(Continued)

*Primary Examiner* — Jessica Han
*Assistant Examiner* — Lorena Bruner
(74) *Attorney, Agent, or Firm* — Nixon & Vanderhye PC (57) ABSTRACT

A power conversion apparatus includes a switch circuit which drives switching elements based on a control signal, a feedback section which performs feedback control, a signal output section which outputs the control signal based on a controlled variable of the feedback control, an output value detecting section which detects an output value outputted from the switch circuit, and an operation determining unit which has an operation stop determination section which determines whether to stop operation of the switching elements based on a rate of change of the output value, and an operation start determination section which determines whether to start operation of the switching elements based on the controlled variable.

12 Claims, 6 Drawing Sheets

(56) References Cited

U.S. PATENT DOCUMENTS

| | | | |
|---|---|---|---|
| 2009/0073733 A1 | 3/2009 | Balakrishnan et al. | |
| 2009/0147547 A1* | 6/2009 | Yamashita | H02M 3/33507 363/21.16 |
| 2010/0202175 A1 | 8/2010 | Balakrishnan et al. | |
| 2011/0211373 A1 | 9/2011 | Balakrishnan et al. | |
| 2012/0224399 A1 | 9/2012 | Balakrishnan et al. | |
| 2013/0336020 A1 | 12/2013 | Balakrishnan et al. | |

FOREIGN PATENT DOCUMENTS

| | | |
|---|---|---|
| JP | 2003-061347 | 2/2003 |
| JP | 2003-324953 | 11/2003 |
| JP | 4765081 | 6/2011 |

\* cited by examiner

FIG.7

POWER CONVERSION APPARATUS

CROSS-REFERENCE TO RELATED APPLICATION

This application is based on and claims the benefit of priority from earlier Japanese Patent Application No. 2013-024769 filed Feb. 12, 2013, the description of which is incorporated herein by reference.

BACKGROUND OF THE INVENTION

Technical Field

The present invention relates to a power conversion apparatus that includes a switch circuit, a feedback section and a signal generating section.

Related Art

In burst mode operation based on conventional art, switching frequencies that fall in an audible frequency band may cause audible noise. Therefore, a technique has been developed, aiming to avoid such frequencies that cause audible noise. For example, an invention dealing with such a technique is disclosed in patent document JP-B-4765081, entitled "Method and apparatus for reducing audible frequency in a switching power supply". According to the technique, control is exerted over periods corresponding to groups of switching cycles of a switch, and over non-switching periods corresponding to intervals between the groups of switching cycles of the switch.

Further, it is desirable that high efficiency is achieved at low cost over an entire range from a light load period to a heavy load period. For example, patent document JP-A-2003-324953 discloses an invention dealing with a technique for achieving high efficiency at low cost, entitled "Switching power supply apparatus". The control means in this invention stops the intermittent turn-on/off operation of the switching element when the first voltage detecting means has detected the increase of a first output voltage up to a first threshold. Further, the control means in this invention starts the intermittent turn-on/off operation of the switching element when a second voltage detecting means has detected the decrease of the first output voltage down to a second threshold.

However, despite the application of the invention disclosed in the patent document JP-B-4765081 to an apparatus, a response lag may be caused in the feedback control in the event that load current has drastically decreased, such as when an output connector has been disconnected. The response lag may lead to too much increase of the output voltage. Therefore, the output side is required to be provided with parts that can withstand high voltage (high-voltage parts), which would necessarily incur high cost.

Further, despite the application of the invention disclosed in the patent document JP-A-2003-324953 to an apparatus, the operation of the switching element is controlled on the basis of the first output voltage and the two thresholds (first and second thresholds). This may raise a problem that the average output voltage value varies between the two thresholds. Resultantly, there may be a range in which the average output voltage value is deviated from an instructed output voltage value and accordingly the output voltage cannot be controlled with high accuracy.

SUMMARY

An embodiment provides a power conversion apparatus which can control an output value with higher accuracy, while minimizing manufacturing cost.

As an aspect of the embodiment, a power conversion apparatus is provided which includes: a switch circuit which drives switching elements based on a control signal; a feedback section which performs feedback control; a signal output section which outputs the control signal based on a controlled variable of the feedback control; an output value detecting section which detects an Output value outputted from the switch circuit; and an operation determining unit which has an operation stop determination section which determines whether to stop operation of the switching elements based on a rate of change of the output value, and an operation start determination section which determines whether to start operation of the switching elements based on the controlled variable.

DETAILED DESCRIPTION OF THE PREFERRED EMBODIMENTS

With reference to the accompanying drawings, hereinafter are described some embodiments of the present invention. In the following description, the term "connect" or "connection" refers to "electrically connect" or "electrical connection" unless otherwise specified. The drawings indicate the elements required for describing the present invention but do not necessarily indicate all the actually used elements. When vertical or horizontal directions are referred to, the directions correspond to the right and left direction or the up and down direction as viewed in the drawings. The alphanumeric characters in series are simply indicated using a symbol "–". For example, the term "switching elements Q1-Q4" refers to "switching elements Q1, Q2, Q3 and Q4".

First Embodiment

Figure 1:
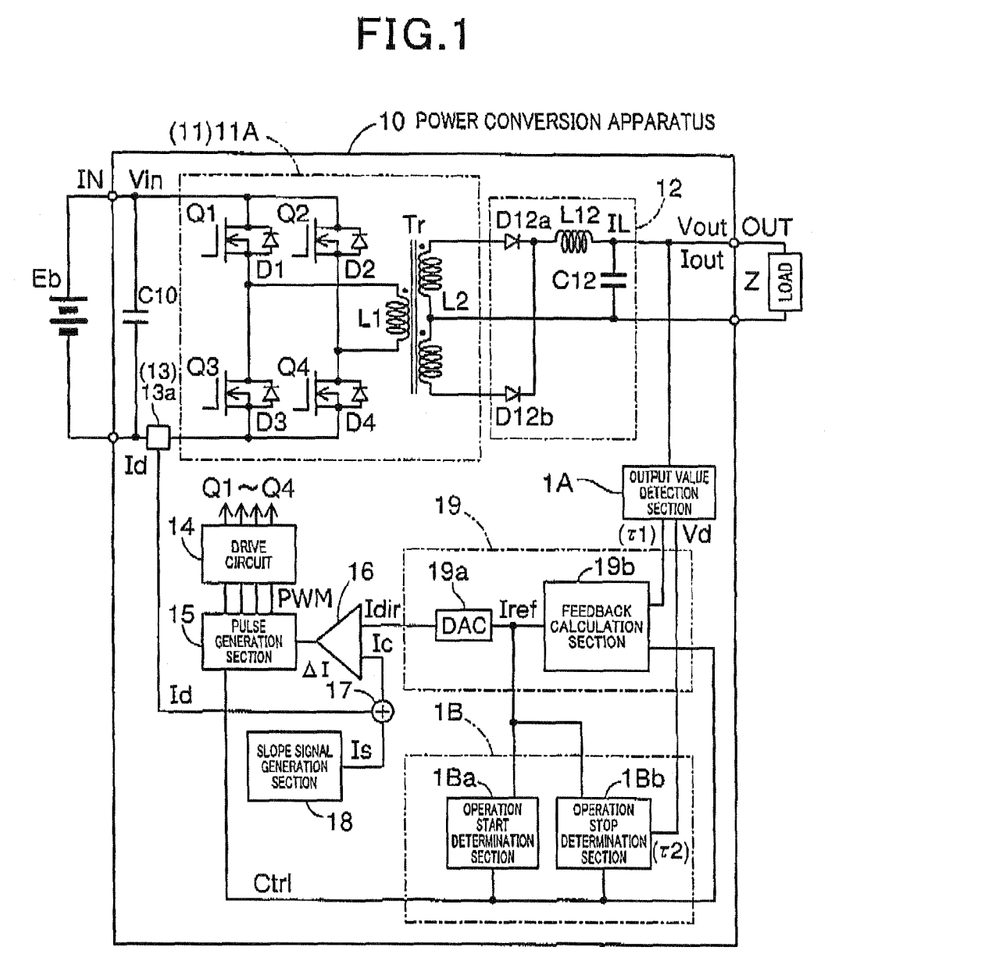
FIG. 1 is a schematic diagram illustrating a first example of a configuration of a power conversion apparatus.

Referring to FIGS. 1 to 5, hereinafter is described a first embodiment of the present invention. FIG. 1 shows a power conversion apparatus 10 that is an example of a switching power supply apparatus (DC/DC converter). The power conversion apparatus 10 has a function of converting an input voltage Vin (e.g., 288 V) to a required output voltage Vout (e.g., 14 V) and outputting the converted voltage. The power conversion apparatus 10 has an input terminal IN to which a power source Eb is connected, and has an output terminal OUT to which a load Z is connected. For example, the power source Eb corresponds to a battery (secondary cell, or the like) or a fuel cell. For example, the load Z corresponds to a battery having a power source capacity which is different from that of the power source Eb, or corresponds to a rotary electric machine (motor-generator, generator, motor, or the like) or headlamps. The output voltage Vout may be set to an optionally selected value. The output voltage Vout may be set in the power conversion apparatus 10 or may be set on the basis such as of signals or data received from an external processor (e.g., ECU or computer).

The power conversion apparatus 10 shown in FIG. 1 includes a capacitor C10, switch circuit 11A, transformer Tr, rectifying/smoothing circuit 12, first detection section 13a, drive circuit 14, pulse generation section 15, slope voltage generation section 16, signal calculation section 17, signal comparison section 18, feedback unit (section, means) 19, second detection section 1A and operation determining unit (section, means) 1B. The components of the power conversion apparatus 10 are briefly described below. In the power conversion apparatus 10, various signals, such as a detected current value Id and a detected voltage value Vd, are dealt in a form that can be processed (e.g., voltage value or data) in each of the components, unless otherwise specified.

The capacitor C10 is connected between both ends of the input terminal IN to smooth the input voltage Vin which is inputted from the power source Eb.

The switch circuit 11A includes switching elements Q1-Q4, diodes D1-D4 and the transformer Tr. The switching elements Q1-Q4 are configured into a full-bridge circuit and are turned on/off in accordance with a pulse-width modulation signal PWM (corresponding to control signal) which is inputted to an input terminal (e.g., gate terminal) of each of the switching elements from the drive circuit 14. Each of the diodes D1-D4 is parallelly connected between an input terminal (e.g., drain terminal) and an output terminal (e.g., source terminal) of the corresponding one of the switching elements Q1-Q4. These diodes function as freewheel diodes. The output terminal of the switching element Q1 and the input terminal of the switching element Q2 are connected to each other via a connecting point which is connected to one terminal of a primary coil L1 of the transformer Tr. Similarly, the output terminal of the switching element Q3 and the input terminal of the switching element Q4 are connected to each other via a connecting point which is connected to the other terminal of the primary coil L1 of the transformer Tr.

The transformer Tr includes the primary coil L1 and a secondary coil L2 having a center tap. Connection of the primary coil L1 is established as mentioned above. Both ends of the secondary coil L2 are connected to one end side (positive side) of the output terminal OUT via diodes D12a and D12b and a coil L12. The center tap of the secondary coil L2 is connected to the other end side (negative side) of the output terminal OUT.

The rectifying/smoothing circuit 12 includes a rectifying section that performs full-wave rectification, and a smoothing section that smoothes the output voltage Vout. In the configuration shown in FIG. 1, the rectifying section includes the diodes D12a and D12b to rectify alternating-current voltage outputted from the secondary coil L2 to direct-current voltage. The smoothing section serves as an LC filter which includes the coil L12 and a capacitor C12. The diode D12a is connected in series with the coil L12 and the serial connection is connected to an end side of the output terminal OUT. A choke current IL passes through the coil L12. The value of the choke current IL may become equal to that of a load current Iout, or may become different from that of the load current Iout. The capacitor C12 is connected across the ends of the output terminal OUT. The second detection section 1A, which will be described later, is connected to an end side of the output terminal OUT (an end side of the capacitor C12 in particular).

The first detection section 13a detects the detected current value Id (corresponding to an input value) inputted to the switch circuit 11A.

The second detection section 1A detects an output value outputted from the switch circuit 11A and outputs the detected value as an output detection value. In the following description of the present embodiment, an output voltage Vout is used as the output value and a detected voltage value Vd is used as the output detection value. Although not shown in the drawings or not described in the specification, an output current value and a detected current value, or an output power value and a detected power value may be used as the output value and the output detection value, respectively. If the impedance of the load Z is available, the second detection section 1A may calculate the load current Iout on the basis of the output voltage Vout (i.e. detected voltage value Vd) and output the calculated value as a detected current value.

In general, the detected current value Id of the input value varies in a manner of a waveform signal, while the detected voltage value Vd of the output value varies in accordance with the conditions so such as of the load Z. The number of outputs of the detected voltage value Vd may be one or two or more while the switching elements Q1-Q4 are turned on. The timing of detection may also be optionally set if it falls in a period when the switching elements Q1-Q4 are turned on. For example, the outputs of the detected voltage value Vd may include a minimum value in an on state, an average value in an on state or a peak value (maximum value) in an on state. A time constant $\tau 1$ of the detected voltage value Vd to be outputted to a feedback calculation section 19b may be set so as to be equal to or larger than a time constant $\tau 2$ of the detected voltage value Vd to be outputted to the operation determining unit 1B ($\tau 1 \geq \tau 2$).

The drive circuit 14 and the pulse generation section 15 correspond to a "signal output means (section)". The pulse generation section 15 generates and outputs a pulse wave (pulse-width modulation signal PWM in the present embodiment) on the basis of a differential current value $\Delta I$ transmitted from the signal comparison section 18 described later. The drive circuit 14 amplifies and outputs the pulse-width modulation signal PWM transmitted from the pulse generation section 15, so that a corresponding one of the switching elements Q1-Q4 is activated.

The slope voltage generation section 16 generates and outputs a slope signal value Is for gradually increasing (or gradually decreasing) a targeted signal (detected current value Id in the example shown in FIG. 1). The slope signal value Is varies with time in a manner of a sawtooth wave and is reset at every predetermined cycle. The signal calculation section 17 adds up the detected current value Id and the slope signal value Is and outputs the sum as a composite current value Ic. The signal comparison section 18 (comparator) calculates and outputs the differential current value $\Delta I$ that is a difference between the composite current value Ic, as a reference value transmitted from the signal calculation section 17, and a command current value Idir transmitted from the feedback unit 19 (specifically, DAC 19a) described later.

The feedback unit 19 indicated by a dash-dot line in FIG. 1 includes the DAC 19a (digital-analog converter) and a feedback calculation section 19b. All or a part of the components of the feedback unit 19 may be configured by hardware components or may be configured by software components that are realized by CPU's execution of programs.

The feedback calculation section 19b performs required calculation on the basis of the detected voltage value Vd transmitted from the second detection section 1A, and outputs a feedback controlled variable Ipi. In the present embodiment, the feedback calculation section 19b performs calculation for proportional control (P control) and integral control (I control) so that a required output voltage Vout is achieved. As necessary, the feedback calculation section 19b may additionally perform calculation for derivative control (D control).

The DAC 19a converts a control current value Iref (data corresponding to the "controlled variable") transmitted from the feedback calculation section 19b to the command current value Idir that is an analog signal and outputs the converted signal.

The operation determining unit 1B indicated by another dash-dot line in FIG. 1 includes an operation start determination section 1Ba and an operation stop determination section 1Bb. All or a part of the components of the operation determining unit 1B may be configured by hardware components or may be configured by software components that are realized by CPU's execution of programs.

The operation start determination section 1Ba determines whether to start the operation of the switching elements Q1-Q4 on the basis of the control current value Iref, and outputs an operation control signal Ctrl that includes the result of the determination.

The operation stop determination section 1Bb determines whether to stop the operation of the switching elements Q1-Q4 on the basis of a rate of change $\Delta d$ of the output value, and outputs the operation control signal Ctrl that includes the result of the determination. The rate of change $\Delta d$ is a variation per unit time. In the case of the detected voltage value Vd, the rate of change $\Delta d$ corresponds to an increase variation $\Delta v$ per unit time $\Delta t$ ($\Delta d=|\Delta v|/\Delta t$). In the case of the detected current value, the rate of change $\Delta d$ corresponds to a decrease variation $\Delta i$ per unit time $\Delta t$ ($\Delta d=|\Delta i|/\Delta t$). Although the increase variation $\Delta v$ and the decrease variation $\Delta i$ here are expressed by absolute values $|\Delta v|$ and $|\Delta i|$, respectively, the absolute values do not have to be necessarily calculated when the positive or negative sign of the variables is apparent.

In the present embodiment, criteria for determination is made different depending on a determination threshold $\Delta th$ that corresponds to the "threshold". Specifically, if the rate of change $\Delta d$ is less than the determination threshold $\Delta th$ ($\Delta d<\Delta th$), whether to stop the operation of the switching elements Q1-Q4 is determined on the basis of the control current value Iref. In contrast, if the rate of change $\Delta d$ is equal to or more than the determination threshold $\Delta th$ ($\Delta d\geq\Delta th$), whether to stop the operation of the switching elements Q1-Q4 is determined on the basis of the output value (e.g., detected voltage value Vd or detected current value). The "determination threshold $\Delta th$" may be set to an optional predetermined value. As an example, the determination threshold $\Delta th$ may be a value that corresponds to an abnormal situation, or may be a value that corresponds to the speed of calculation in the feedback calculation section 19b, or may be a value that corresponds to the dead time of the switching elements Q1-Q4.

Referring to FIGS. 2 to 5, hereinafter is described an example of how the switching elements Q1-Q4 are controlled in the power conversion apparatus 10, or, specifically, how the operation of the switching elements Q1-Q4 is stopped or started. It should be appreciated that start of operation includes restart of operation.

Figure 2:
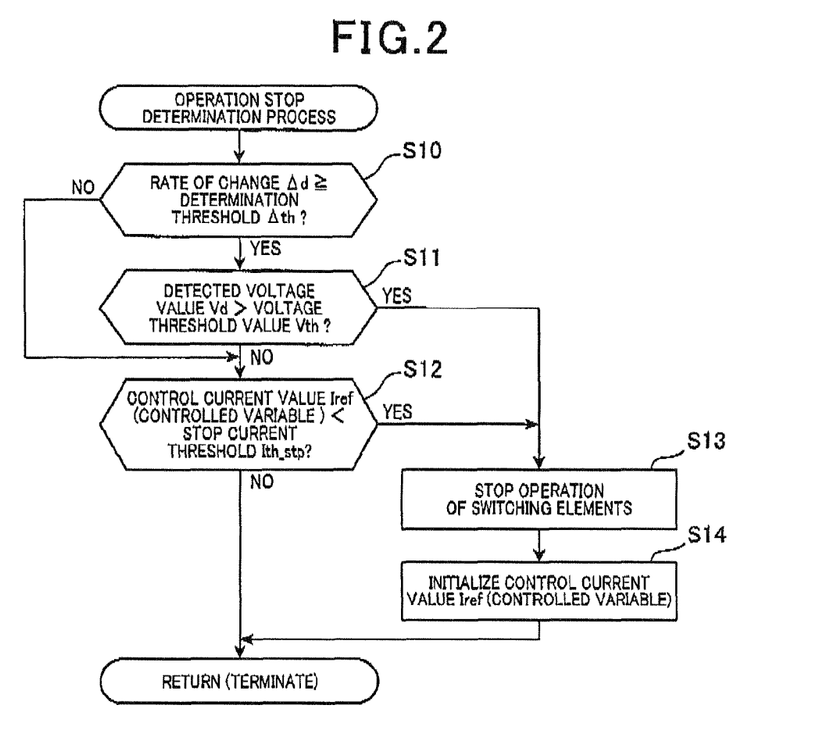
FIG. 2 is a flow diagram illustrating an example of a first procedure of an operation stop determination process.

FIG. 2 shows an operation stop determination process that corresponds to the operation stop determination section 1Bb. The operation stop determination process is repeatedly performed while the switching elements Q1-Q4 are in operation. First, it is determined whether or not the rate of change $\Delta d$ is equal to or larger than the determination threshold $\Delta th$ [$\Delta d\geq\Delta th$; step S10]. Alternative to this, it may be determined whether or not the rate of change $\Delta d$ exceeds the determination threshold $\Delta th$ ($\Delta d>\Delta th$).

The reason why the rate of change $\Delta d$ is targeted for determination is to clarify whether an abnormal situation has occurred or not. The abnormal situation corresponds to a situation in which electric power cannot be steadily supplied to the load Z, such as when a connector has come off, or short circuit has occurred. If the rate of change $\Delta d$ is equal to or larger than the determination threshold $\Delta th$ (YES), it is determined that an abnormal situation has occurred and the control branches to step S11. In contrast, if the rate of change $\Delta d$ is less than the determination threshold $\Delta th$ (NO), it is determined that an abnormal situation has not occurred and the control branches to step S12.

In step S11, it is determined whether or not the detected voltage value Vd exceeds a voltage threshold Vth (Vd>Vth). If the detected voltage Vd is equal to or less than the voltage threshold Vth (NO), the control proceeds to step S12. On the other hand, if the detected voltage value Vd exceeds the voltage threshold Vth, the operation control signal Ctrl is transmitted to the pulse generation section 15 to stop the operation of the switching elements Q1-Q4 [step S13]. Further, the operation control signal Ctrl is transmitted to the feedback calculation section 19b to initialize the control current value Iref with a predetermined amount [step S14]. The predetermined amount may be an optionally set numerical amount, such as zero. In step S11, a determination may alternatively be made as to whether or not the detected voltage value Vd is equal to or more than the voltage threshold Vth (Vd≥Vth).

In step S12, it is determined whether or not the control current value Iref calculated by and transmitted from the feedback calculation section 19b is less than a stop current threshold Ith_stp (Iref<Ith_stp). If the control current value Iref is less than the stop current threshold Ith_stp (YES), steps S13 and S14 described above are performed. On the other hand, if the control current value Iref is equal to or more than the stop current threshold Ith_stp (NO), control immediately returns to step S10 (or the process is immediately terminated). In step S12, a determination may alternatively be made as to whether or not the control current value Iref is equal to or less than the stop current threshold Ith_stp (Iref≤Ith_stp).

Figure 3:
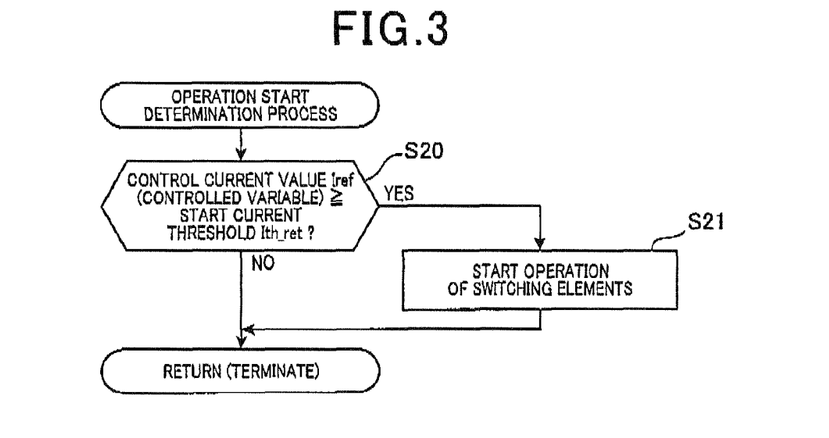
FIG. 3 is a flow diagram illustrating an example of a procedure of an operation start determination process.

FIG. 3 shows an operation start determination process that corresponds to the operation start determination section 1Ba. The operation start determination process is repeatedly performed while the switching elements Q1-Q4 are stopped. In the present embodiment, a start current threshold Ith_ref and the stop current threshold Ith_stp are set to different values so that hysteresis characteristics are exhibited, with the magnitude relationship being Ith_ret>Ith_stp.

First, it is determined whether or not the control current value Iref calculated by and transmitted from the feedback calculation section 19b is equal to or more than the start current threshold Ith_ret [step S20]. If the control current value Iref is determined to be equal to or more than the start current threshold Ith_ret (YES), the operation control signal Ctrl is transmitted to the pulse generation section 15 to start operation of the switching elements Q1-Q4 [step S21]. On the other hand, if the control current value Iref is less than the start current threshold Ith_ret (NO), the control immediately returns to step S20 (or the process is immediately terminated).

Figure 4:
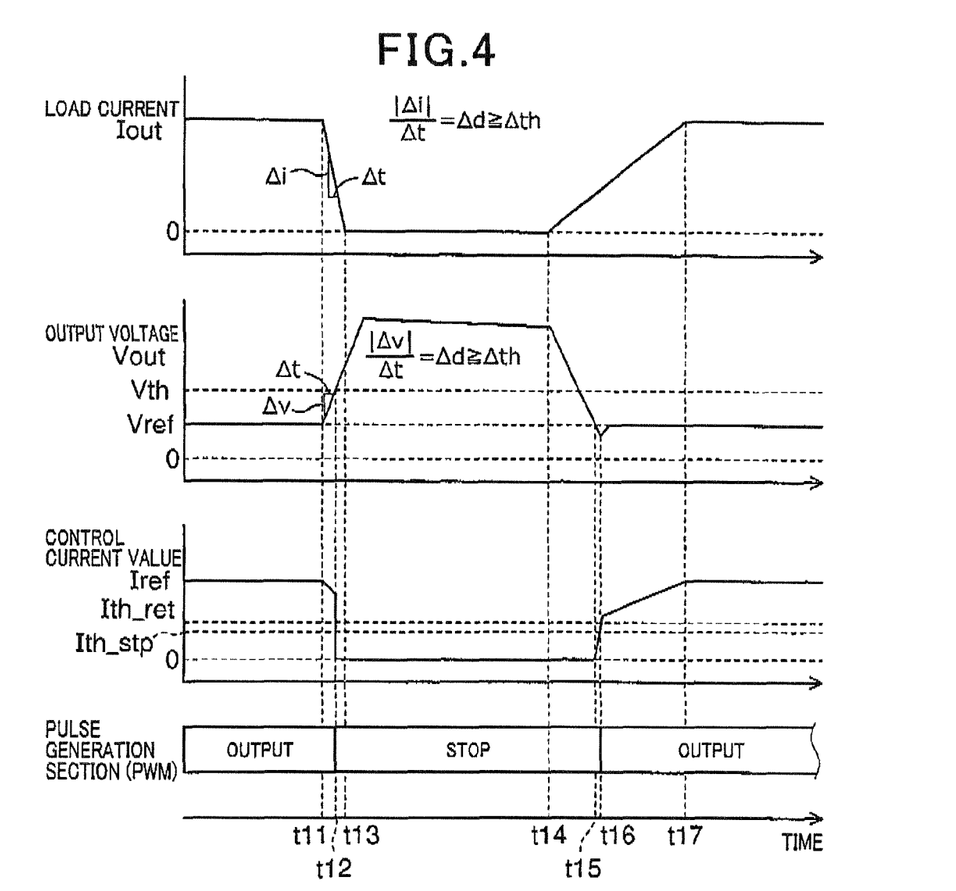
FIG. 4 is a timing diagram illustrating an example of control performed in the apparatus, under which the rate of change becomes equal to or larger than a threshold.
Figure 5:
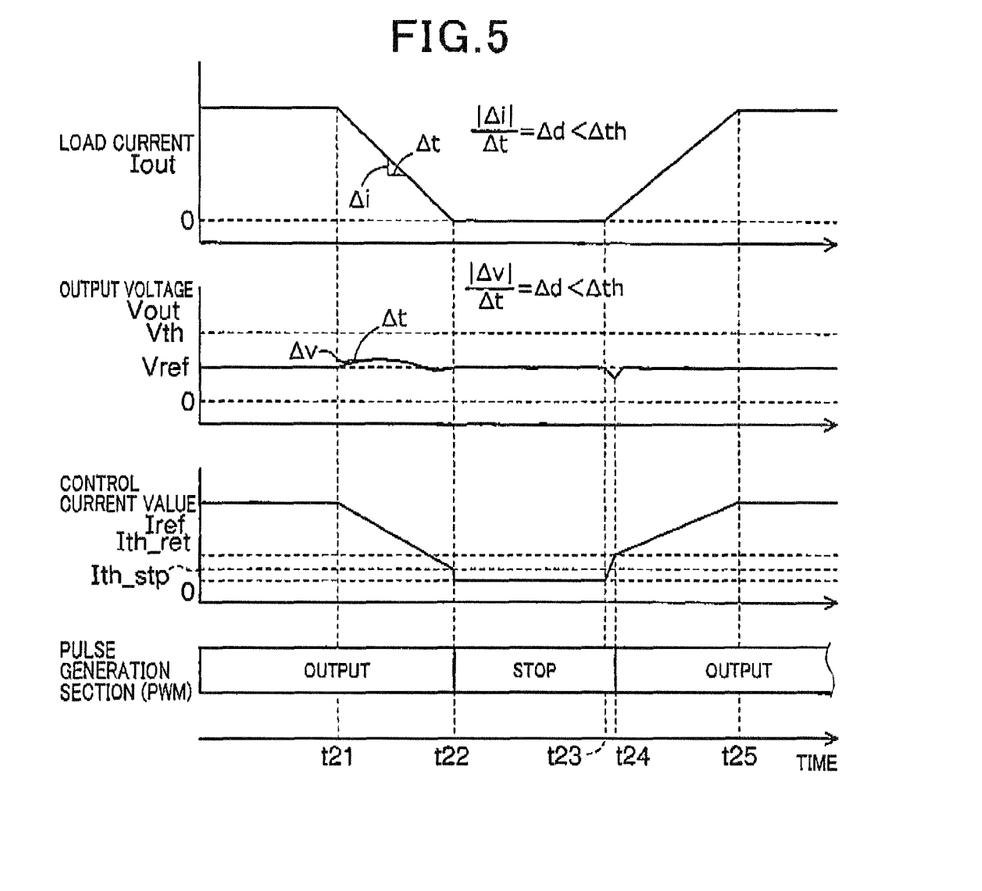
FIG. 5 is a timing diagram illustrating an example of control performed in the apparatus, under which the rate of change becomes smaller than the threshold.

FIGS. 4 and 5 each show an example of the control performed by the operation determining unit 1B described above. FIG. 4 shows an example of the control in which the rate of change Δd is equal to or more than the determination threshold Δth. FIG. 5 shows an example of the control in which the rate of change Δd is less than the determination threshold Δth. In both of FIGS. 4 and 5, the items from the top to the bottom indicate: load current Iout passing through the load Z; output voltage Vout; control current value Iref; and change in the operation of the switching elements Q1-Q4 in response to the generation of the pulse-width modulation signal PWM.

In FIG. 4, the load current Iout up to time t11 is feedback-controlled so as to be maintained at the control current value Iref. The load current Iout starts drastically decreasing from time t11. When the rate of change Δd in the drastic decrease is equal to or more than the determination threshold Δth, the output voltage Vout drastically increases. At time t12 when the output voltage Vout exceeds the voltage threshold Vth, the operation control signal Ctrl is transmitted to the pulse generation section 15 from the operation stop determination section 1Bb to thereby stop generation (output) of the pulse-width modulation signal PWM (steps S11 and S13 of FIG. 2). The switching elements Q1-Q4, which do not receive the pulse-width modulation signal PWM any more, stop operation. The same applies to the case where the control current value Iref becomes smaller than the stop current threshold Ith_stp. Thus, at time t12, the switching elements Q1-Q4 stop operation (steps S12 and S13 of FIG. 12). Also, upon stopping the operation (i.e. at time t12), the control current value Iref is initialized to zero (predetermined value) (step S14 of FIG. 2).

After time t12, the output voltage Vout varies with charge and discharge of the capacitor C12. Then, from time t14, the load current Iout starts increasing, when the output voltage Vout starts drastically decreasing. At time t15 when the output voltage Vout becomes less than the control voltage value Vref (Vout<Vref), the control current value Iref starts increasing in turn. The control voltage value Vref, which corresponds such as to the "command voltage value (command value)" or the "target voltage value (target value)", may be optionally set. The control voltage value Vref is set in advance in the power conversion apparatus 10, or transmitted from an external unit (e.g., ECU or computer).

At time t16 when the control current value Iref becomes equal to or more than the start current threshold Ith_ret, the operation so control signal Ctrl is transmitted to the pulse generation section 15 from the operation stop determination section 1Bb to thereby start generation (output) of the pulse-width modulation signal PWM (steps S20 and S21 of FIG. 3). After the switching elements Q1-Q4 have started operation, the feedback unit 19 performs feedback control. Specifically, the control current value Iref is permitted to increase until time t17 when it becomes equivalent to the load current Iout and, on or after time t17, maintained at that level.

In FIG. 5, the load current Iout up to time t21 is feedback-controlled so as to be maintained at the control current value Iref. From time t21, the load current Iout starts decreasing. When the rate of change Δd in the decrease is smaller than the determination threshold Δth, the increase of the output voltage Vout is moderate. Since the decrease of the load current Iout is moderate, the output voltage Vout is feedback-controlled so as to be maintained at the control voltage value Vref. Then, at time 22 when the control current value Iref becomes smaller than the stop current threshold Ith_stp, the operation control signal Ctrl is transmitted to the pulse generation section 15 from the operation stop determination section 1Bb to thereby stop generation (output) of the pulse-width modulation signal PWM (steps S12 and S13 of FIG. 2). The switching elements Q1-Q4, which do not receive the pulse-width modulation signal PWM any more, stop operation.

After time t22 as well, the output voltage Vout is maintained at the control voltage value Vref. When the load current Iout starts increasing from time t23, the output voltage Vout temporarily starts decreasing. Then, at time t24 when the load current Iout becomes equal to or more than the start current threshold Ith_ret, the output voltage Vout starts increasing and is maintained at the control voltage value Vref.

Also, at time t24, the operation control signal Ctrl is transmitted to the pulse generation section 15 from the operation stop determinations section 1Bb to thereby start generation (output) of the pulse-width modulation signal PWM (steps S20 and S21 of FIG. 3). After the switching elements Q1-Q4 have started operation, the feedback unit 19 performs feedback control. Specifically, the control current value Iref is permitted to increase until time t25 and, on or after time t25, maintained at that level.

According to the first embodiment described above, advantageous effects as set forth below are obtained.

(1) The power conversion apparatus 10 is configured to include the second detection section 1A (output value detecting section, output value detecting means) and the operation determining unit 1B (see FIGS. 1 to 5). The second detection section 1A detects the output voltage Vout (output value), as the detected voltage value Vd, outputted from the switch circuit 11A. The operation determining unit 1B has the operation stop determination section 1Bb and the operation start determination section 1Ba. The operation stop determination section 1Bb determines whether to stop the operation of the switching elements Q1-Q4 on the basis of the rate of change Δd of the output value (e.g. detected voltage value Vd or detected current value). The operation start determination section 1Ba determines whether to start the operation of the switching elements Q1-Q4 on the basis of the control current value Iref (controlled variable). According to this configuration, the operation control of the switching elements Q1-Q4 is performed while the rate of change Δd of the output value is monitored. Accordingly, the output voltage Vout can be controlled with high accuracy. Further, since no high-voltage parts are required to be used on the output side, manufacturing cost can be minimized.

(2) The operation stop determination section 1Bb is configured to determine whether to stop the operation of the switching elements Q1-Q4 on the basis of the control current value Iref (controlled variable) if the rate of change Δd of the output value is less than the determination threshold Δth (threshold) (see FIGS. 1, 2 and 5). According to this configuration, the operation of the switching elements Q1-Q4 is controlled on the basis of the control current value Iref. Since feedback control is continued, the output voltage Vout can be controlled with higher accuracy. In other words, the average value of the output voltage Vout will not be deviated from the control voltage value Vref (e.g., command voltage value or target voltage value). Thus, highly efficient and steady low-load operation can be realized.

(3) The operation stop determination section 1Bb is configured to determine whether to stop the operation of the switching elements Q1-Q4 on the basis of the detected voltage value Vd if the rate of change Δd of the output value is equal to or more than the determination threshold Δth (threshold) (see FIGS. 1, 2 and 4). According to this configuration, the operation of the switching elements Q1-Q4 is controlled on the basis of the detected voltage value Vd and accordingly no response lag will be caused in the feedback control. Since drastic increase of the output voltage Vout is suppressed in the occurrence of an abnormal situation, the required withstand voltage of the rectifying/smoothing circuit 12 can be decreased. Accordingly, the withstand voltage of parts can be decreased when the output is used as an internal control voltage source. Thus, the power conversion apparatus 10 can be produced at low cost.

(4) The feedback unit 19 is configured to initialize the control current value Iref (controlled variable) to zero (predetermined value) during the feedback calculation (see steps S13 and S14 of FIG. 2). According to this configuration, the control current value Iref is forcibly initialized even when feedback calculation is performed to minimize the occurrence of hunting phenomenon in which stop and start of the pulse-width modulation signal PWM (operation of the switching elements Q1-Q4) are frequently repeated.

(5) The feedback unit 19 is configured to initialize the control current value Iref (controlled variable) with zero (predetermined value) when stopping the operation of the switching elements Q1-Q4 (see steps S13 and S14 of FIG. 2). According to this configuration, the control current value Iref is initialized with zero when the operation of the switching elements Q1-Q4 is stopped. As a result, hunting phenomenon is more reliably suppressed, in which stop and start of the pulse-width modulation signal PWM (operation of the switching elements Q1-Q4) are frequently repeated. The similar advantageous effects can be achieved when a numerical value other than zero is used as the predetermined amount.

(6) The second detection section 1A is configured to output a plurality of detected voltage values Vd while the switching elements Q1-Q4 are turned on (see FIG. 1). According to this configuration, the output voltage Vout only has to be detected while the switching elements Q1-Q4 are turned on. Thus, the configuration of the second detection section 1A can be simplified (and, further, manufacturing cost is reduced).

(7) The second detection section 1A is configured such that the time constant τ1 of the detected voltage value Vd outputted to the feedback calculation section 19b, which calculates the control current value Iref, will be equal to or more than the time constant τ2 of the detected voltage value Vd outputted to the operation determining unit 1B (see FIG. 1). According to this configuration, the detected voltage value Vd outputted to the feedback calculation section 19b is transmitted with or later than the detected voltage Vd outputted to the operation determining unit 1B. By setting the time constants in this way, steady feedback control is realized using the feedback unit 19, while the increase of the output voltage Vout is suppressed in the occurrence of an abnormal situation. Thus, withstand voltage of parts can be further decreased to thereby further reduce manufacturing cost of the power conversion apparatus 10.

(8) The switch circuit 11A is configured to include the transformer Tr that has a primary coil (L1) and a secondary coil (L2), while the feedback unit 19 is configured to use the detection value (e.g., detected voltage value Vd or detected current value) of the secondary coil L2 side as the output value (see FIGS. 1 and 2). According to this configuration, the operation of the switching elements Q1-Q4 is controlled, while the output value (specifically, the rate of change Δd of the output value) that is the detection value on the secondary coil L2 side is monitored. Accordingly, the detected voltage value Vd is controlled with high accuracy. Further, since no high-voltage parts are required on the output side, manufacturing cost can be minimized.

Second Embodiment

Figure 6:
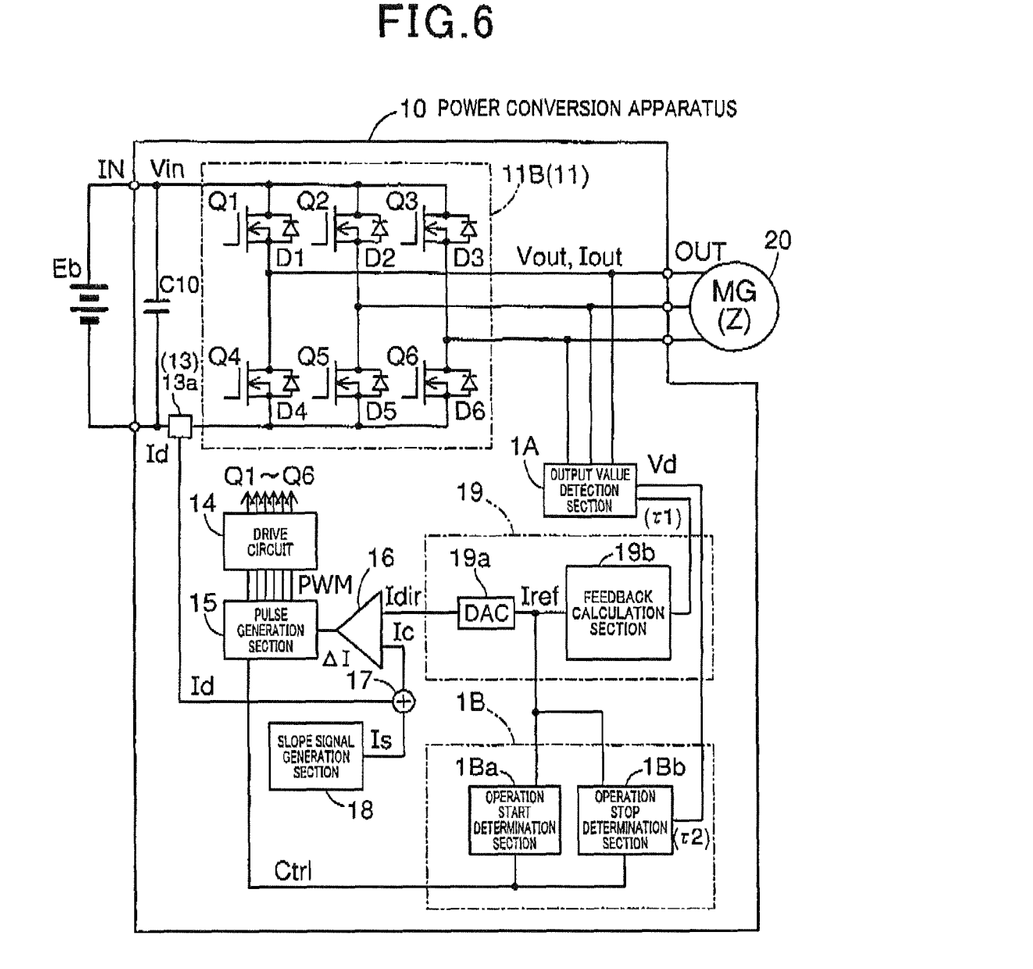
FIG. 6 is a schematic diagram illustrating a second example of a configuration of the power conversion apparatus.

Referring now to FIG. 6, a second embodiment of the present invention is described. The configuration and the like of the power conversion apparatus 10 are similar to those in the first embodiment. The second embodiment will be described focusing on the differences from the first embodiment for the sake of simplifying illustration and description. Accordingly, the components identical with or similar to those in the first embodiment are given the same reference numerals for the sake of omitting unnecessary explanation.

The second embodiment is different from the first embodiment in the switch circuit 11 and the load Z. The switch circuit 11 in the first embodiment outputs constant voltage, but the one in the second embodiment allows the voltage value and the frequency in relation to the output voltage Vout to change with time. A rotary electric machine 20 (indicated as "MG" in FIG. 6) that is an inductive element is used as the load Z. Thus, the power conversion apparatus 10 according to the second embodiment is an example of an inverter.

The power conversion apparatus 10 shown in FIG. 6 includes a switch circuit 11B in place of the switch circuit 11A shown in FIG. 1. The switch circuit 11B includes switching elements Q1-Q6 and diodes D1-D6. The switching elements Q1-Q6 are each turned on/off according to the pulse-width modulation signal PWM inputted to an input terminal (e.g., gate terminal) from the drive circuit 14. The switch circuit 11B is configured into a half-bridge circuit having an upper arm composed of the switching elements Q1, Q2 and Q3 and a lower arm composed of the switching elements Q4, Q5 and Q6. Each of the diodes D1-D6 is parallelly connected between an input terminal (e.g., drain terminal) and an output terminal (e.g., source terminal) of the corresponding one of the switching elements Q1-Q6. These diodes function as freewheel diodes.

The output terminal of the switching element Q1 and the input terminal of the switching element Q4 are connected to each other via a connecting point which is connected to the output terminal OUT of a first phase (e.g., U phase). The output terminal of the switching element Q2 and the input terminal of the switching element Q5 are connected to each other via a connecting point which is connected to the output terminal OUT of a second phase (e.g., V phase). The output terminal of the switching element Q3 and the input terminal of the switching element Q6 are connected to each other via a connecting point which is connected to the output terminal OUT of a third phase (e.g., W phase).

Since the output voltage Vout is three-phase alternating voltage, the second detection section 1A detects, as the detected voltage value Vd, a voltage value (e.g., instantaneous value, absolute value, peak value or effective value) of alternating-current voltage. The rest of the elements of the power conversion apparatus 10 have functions similar to those of the first embodiment. Accordingly, the power conversion apparatus 10 according to the second embodiment can realize the control example shown in FIGS. 2 to 5 of the first embodiment. Thus, since the operation of the switching elements Q1-Q6 is controlled, while the rate of change Δd of the output value is monitored, the output voltage Vout can be controlled with high accuracy. Further, since no high-voltage parts are required to be used on the output side, manufacturing cost can be minimized.

Except for the switch circuit 11B and the load Z, the configuration of the second embodiment is similar to that of the first embodiment. Thus, the second embodiment can obtain the advantageous effects similar to those of the first embodiment.

Other Embodiments

The first and second embodiments that implement the present invention have so far been described. However, the present so invention shall not be limited to these embodiments. In other words, the present invention may be implemented in various modes as well within a scope not departing from the spirit of the present invention. For example, the present invention may be realized in the modes as set forth below.

Figure 7:
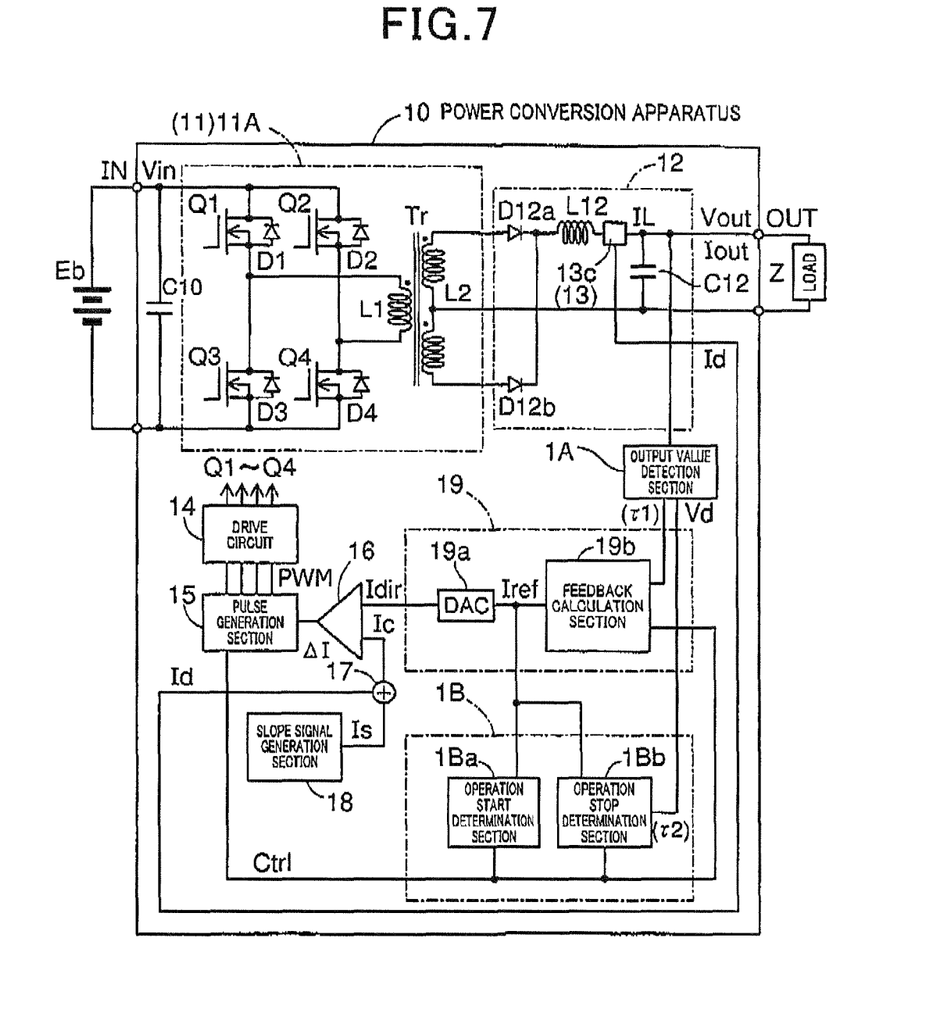
FIG. 7 is a schematic diagram illustrating a third example of a configuration of the power conversion apparatus.

In the foregoing first and second embodiments, the detected current value Id (current value) inputted to the switch circuit 11 (11A or 11B) is used as the first detection value (see FIG. 1 or 6). Alternative to this, as shown in FIG. 7, the detected current value Id of the current outputted from the switch circuit 11 (11A or 11B) (i.e. choke current IL, the same being used in the following description) may be ensured to be used as the first detection value. Instead of the first detection section 13a used in the first and second embodiments, a first detection section 13b may be used. The signal calculation section 17 in this case adds up the detected current value Id for the choke current IL and the slope signal value Is and outputs the sum as the composite current value Ic. A peak detection section 19f detects the peak value of the choke current IL and transmits the detected peak value to a signal calculation section 19d. Although not shown, both of the first detection sections 13a and 13b may be used. In this case, selection or calculation is performed for the detected current values Id derived from the first detection sections 13a and 13b. In the selection, either one of a large detection value or a small detection value may be selected, or a maximum peak value (i.e. peak current value) during the turn-on state of the switching elements may be selected. Or else, as shown in FIG. 6, a current value during the turn-on state of the switching elements may be selected. In the calculation, for example, an average value (including a simple average value, a weighted average value or the like) may be calculated using the detected current values Id derived from the first detection sections 13a and 13b, or a larger value or a smaller value may be calculated. The difference is merely whether the input value derived from the input side of the switch circuit 11 is used or derived from the output side thereof is used. Therefore, the advantageous effects similar to those of the first and second embodiments can be obtained.

In the foregoing first and second embodiments, the detected voltage value Vd of the output voltage Vout (output value) outputted from the switch circuit 11 (11A or 11B) is used as the second detection value (see FIG. 1 or 6). Alternatively, the current value outputted from the switch circuit 11 (11A or 11B) may be used as the output value. In this configuration, the first detection section 13b shown in FIG. 7 may be provided as the "second detection section" replacing the second detection section 1A. The difference is merely whether the output value derived from the output side of the switch circuit 11 is used or derived from the input side thereof is used. Therefore, the advantageous effects similar to those of the first and second embodiments can be obtained.

In the foregoing first and second embodiments, the power conversion apparatus 10 is used as a DC/DC converter (first embodiment) and an inverter (second embodiment) (see FIG. 1 or 6). Alternatively, the power conversion apparatus 10 may be used as a different power conversion apparatus that includes a plurality of switching elements and an inductive element, such as the transformer Tr or the rotary electric machine 20. In such a different power conversion apparatus as well, stop and start in relation to the operation of the switching elements Q1-Q4 (Q1-Q6) will be controlled while the rate of change Δd of the output value is monitored. Accordingly, the output voltage Vout can be controlled with high accuracy. Further, since no high-voltage parts are required to be used on the output side, manufacturing cost can be minimized.

In the first embodiment, the transformer Tr is used as the inductive element (see FIG. 1), while, in the second embodiment, the rotary electric machine 20 is used as the inductive element (see FIG. 6). Alternatively, a coil may be used as the inductive element. Further, alternative to the transformer Tr having a center tap, a transformer without having a center tap may be used as the inductive element. Whichever of these inductive elements may be used in the configuration, stop and start in relation to the operation of the switching elements Q1-Q4 (Q1-Q6) are controlled while the rate of change Δd of the output value is monitored. Accordingly, the output voltage Vout can be controlled with high accuracy. Further, since no high-voltage parts are required to be used on the output side, manufacturing cost can be minimized.

Hereinafter, aspects of the above-described embodiments will be summarized.

The power conversion apparatus (10) includes: a switch circuit (11, 11A, 11B) which drives switching elements (Q1-Q4) based on a control signal; a feedback section (19) which performs feedback control; a signal output section (14, 15) which outputs the control signal based on a controlled variable (Iref) of the feedback control; an output value detecting section (1A) which detects an output value outputted from the switch circuit; and an operation determining unit (1B) which has an operation stop determination section (1Bb) which determines whether to stop operation of the switching elements based on a rate of change of the output value, and an operation start determination section (1Ba) which determines whether to start operation of the switching elements based on the controlled variable.

According to this configuration, the operation stop determination section determines whether to stop the operation of the switching elements on the basis of the rate of change of the output value. Since the operation of the switching elements is controlled while the rate of change of the output value is monitored, the output value can be controlled with high accuracy. Further, since no high-voltage parts are required to be used on the output side, manufacturing cost can be minimized.

In the power conversion apparatus, the operation stop determination section determines whether to stop the operation of the switching elements based on the controlled variable if the rate of change of the output value is less than a threshold.

According to this configuration, when the rate of change of the output value is less than the threshold, a determination on whether to stop the operation of the switching elements is made on the basis of the controlled variable of the feedback control. When the rate of change of the output value is smaller, response lag is also smaller in the feedback control. Accordingly, the output value can be controlled with higher accuracy.

In the power conversion apparatus, the operation stop determination section determines whether to stop the operation of the switching elements based on the output value if the rate of change of the output value is equal to or more than a threshold.

According to this configuration, when the rate of change of the output value is equal to or more than the threshold, a determination on whether to stop the operation of the switching elements is made on the basis of the output value. When the rate of change of the output value is larger, response lag is caused in the feedback control. Therefore, the determination based on the output value can achieve control of the output value with higher accuracy.

The "output value" is a value in terms of an output and therefore a voltage value, a current value or a power value may be used as the "output value". The "rate of change" refers to a variation per unit time. The "threshold" may be optionally set in accordance with the response lag in the feedback control.

What is claimed is:

1. A power conversion apparatus, comprising:
    a switch circuit which drives switching elements based on a control signal;
    a feedback section which performs feedback control;
    a signal output section which outputs the control signal based on a controlled variable of the feedback control;
    an output value detecting section which detects an output value outputted from the switch circuit; and
    an operation determining unit which has an operation stop determination section which determines whether to stop operation of the switching elements based on a rate of change of the output value, and an operation start determination section which determines whether to start operation of the switching elements based on the controlled variable, wherein
    the operation stop determination section determines whether to stop the operation of the switching elements based on the controlled variable if the rate of change of the output value is less than a threshold, and
    the operation stop determination section determines whether to stop the operation of the switching elements based on the output value if the rate of change of the output value is equal to or more than the threshold.

2. The power conversion apparatus according to claim 1, wherein
    the feedback section initializes the controlled variable to a predetermined value during feedback calculation.

3. The power conversion apparatus according to claim 2, wherein
    the feedback section initializes the controlled variable with the predetermined value when stopping the operation of the switching elements.

4. The power conversion apparatus according to claim 1, wherein
    the output value detecting section outputs a plurality of output values while the switching elements are turned on.

5. The power conversion apparatus according to claim 4, wherein the output value detecting section sets a time constant of the output value outputted to a calculation section of the feedback section, which calculates the controlled variable, so as to be equal to or more than a time constant of the output value outputted to the operation determining unit.

6. The power conversion apparatus according to claim 1, wherein
    the switch circuit includes a transformer which has a primary coil and a secondary coil, and
    the feedback section uses a detection value of the secondary coil side as the output value.

7. The power conversion apparatus according to claim 1, wherein the output value is an output voltage value outputted from the switch circuit.

8. The power conversion apparatus according to claim 1, wherein the output value is an output current value outputted from the switch circuit.

9. The power conversion apparatus according to claim 1, wherein the output value is an output power value outputted from the switch circuit.

10. The power conversion apparatus according to claim 1, wherein the threshold is a value corresponding to an abnormality.

11. The power conversion apparatus according to claim 1, wherein the threshold is a value corresponding to a speed of calculation in a feedback calculation section of the feedback section.

12. The power conversion apparatus according to claim 1, wherein the threshold is a value corresponding to a dead time of the switching elements.

* * * * *